(12) United States Patent
Lux et al.

(10) Patent No.: US 11,326,074 B2
(45) Date of Patent: May 10, 2022

(54) SLURRY FLOOR TREATMENT TECHNOLOGY, SUCH AS CURABLE EPOXY RESIN-BASED SYSTEMS, OTHER RESIN SYSTEMS, AND RELATED RESIN COAT METHODS

(71) Applicant: The Sherwin-Williams Company, Cleveland, OH (US)

(72) Inventors: Thomas M. Lux, Tinley Park, IL (US); Kevin K. Hobbie, Falcon Heights, MN (US); Christopher B. Adams, Plymouth, MN (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 0 days.

(21) Appl. No.: 16/920,515

(22) Filed: Jul. 3, 2020

(65) Prior Publication Data
US 2021/0002508 A1    Jan. 7, 2021

Related U.S. Application Data

(60) Provisional application No. 62/870,963, filed on Jul. 5, 2019.

(51) Int. Cl.
C09D 171/02    (2006.01)

(52) U.S. Cl.
CPC .................. C09D 171/02 (2013.01)

(58) Field of Classification Search
CPC .................................................. C09D 171/02
USPC ....................................................... 524/800
See application file for complete search history.

(56) References Cited

U.S. PATENT DOCUMENTS

| | | | |
|---|---|---|---|
| 3,265,647 A * | 8/1966 | Schaeffer, Jr. | C08L 77/08 523/443 |
| 4,980,400 A | 12/1990 | Sessa et al. | |
| 5,225,455 A | 7/1993 | Sessa et al. | |
| 5,536,775 A | 7/1996 | Curatolo et al. | |
| 5,618,860 A | 4/1997 | Mowrer et al. | |
| 5,961,903 A | 10/1999 | Eby et al. | |
| 6,096,383 A | 8/2000 | Berg et al. | |
| 6,218,001 B1 | 4/2001 | Chen et al. | |
| 6,228,463 B1 | 5/2001 | Chen et al. | |
| 6,291,078 B1 | 9/2001 | Chen et al. | |
| 6,555,216 B2 | 4/2003 | Chen et al. | |
| 6,761,127 B2 | 7/2004 | Field et al. | |
| 6,878,794 B1 | 4/2005 | Keute et al. | |
| 7,384,697 B2 | 6/2008 | Chen et al. | |
| 8,519,091 B2 | 8/2013 | Raymond | |
| 9,457,375 B2 | 10/2016 | Matt et al. | |
| 2006/0099351 A1 | 5/2006 | Field et al. | |
| 2011/0189391 A1 | 8/2011 | Matt et al. | |
| 2016/0244367 A1* | 8/2016 | Gimeno Santos | C08G 18/36 |
| 2016/0369113 A1 | 12/2016 | Matt et al. | |
| 2018/0215945 A1* | 8/2018 | Zhang | C09D 163/00 |

FOREIGN PATENT DOCUMENTS

| | | | |
|---|---|---|---|
| CN | 205296736 | * | 6/2016 |
| CN | 109235833 | * | 1/2019 |

OTHER PUBLICATIONS

Translation of CN 109235833, Jan. 18, 2019. (Year: 2019).*
Translation of CN205296736, Jun. 8, 2016. (Year: 2016).*
Abstract of CN109235833, Jan. 18, 2019. (Year: 2019).*
PCT International Search Report and Written Opinion dated Sep. 18, 2020 for related International Application No. PCT/US2020/040810, 8 pgs.
Webpage, https://usa.sika.com/en/construction/floor-wall/resource-center/product-industry-news/decodur-granite.html "Introducing Decodur Granite" Jan. 4, 2018, and "Refined Décor Meets Lasting Durability" webpage, https://usa.sika.com/en/construction/floor-wall/flooring-systems/sikafloor-decodur.html, 7 pgs.
Webpage, https://usa.sika.com/content/dam/dms/us01/4/Sikafloor%20DecoDur%20Granite%20System.pdf, "Sikafloor DecoDur Granite" system sheet, Oct. 2, 2017, 3 pgs.
Webpage, https://usa.sika.com/content/dam/dms/us01/d/Sikafloor-218-DF-Part-A.pdf, Safety Data Sheet Sikafloor®-218 DF Part A, May 15, 2020, 11 pgs.
Webpage, https://usa.sika.com/content/dam/dms/us01/z/Sikafloor-217-Part-B.pdf, Safety Data Sheet Sikafloor®-217 Part B, Jul. 31, 2020, 12 pgs.
Webpage, https://www.buildsite.com/pdf/sika/Sika-DecoDur-Granite-Aggregate-SDS-1852751.PDF, Safety Data Sheet, Sika® DecoDur Granite Aggregate, Revision Date May 26, 2017, 9 pgs.
Webpage, http://dciflooring.com/wp-content/uploads/2014/09/GP_One_Step_Decorative_Resurfacer_System.pdf, "OneStep Decorative Resurfacer," 2011, 4 pgs.
Webpage, https://www.generalpolymers.com/drop/3561.pdf, Protective & Marine Coatings, General Polymers® 3561 Epoxy resin glaze, Sep. 23, 2014, 2 pgs.
Chips Unlimited, Inc., "Safety Data Sheet (GHS SDS)" Version 1.4 brochure, Jun. 14, 2018, 10 pgs.

(Continued)

Primary Examiner — Hui H Chin
(74) Attorney, Agent, or Firm — Fredrikson & Byron, P.A.

(57) ABSTRACT

The invention provides a method of treating a floor, such as with a curable epoxy resin-based system or another resin system. The method involves mixing together a Part A comprising a resin and a Part B comprising a hardener to form an activated multicomponent resin system. In certain embodiments, the activated multicomponent resin system has a viscosity in a range of 900-1,200 centipoise. The method further comprises mixing a Part C comprising particles into the activated multicomponent resin system to form a slurry, spreading the slurry over a floor to form a slurry coat, and allowing the slurry coat to cure. Before and after the slurry coat has cured, it has particles of the Part C distributed substantially uniformly throughout. The invention also provides slurry floor coats and floors bearing such coats, as well as methods for repairing such floor coats and floors.

30 Claims, 11 Drawing Sheets

(56) References Cited

OTHER PUBLICATIONS

ACS International, Inc.—SDS, "Stone Flakes®" brochure, Aug. 5, 2010, 3 pgs.
ACS International Products, L.P.—SDS, "Dura Stone," brochure, Jun. 25, 2019, 3 pgs.
Gebrüder Dorfner GmbH & Co. Kaolin-und Kristallquarzsand-Werke KG, "GRANUCOL® UP MGAF standard blends," brochure, 2007, 1 pg.
MiniFibers, Inc., "Safety Data Sheet," brochure, Jun. 1, 2015, 5 pgs.
English Translation of Chinese Publication No. 109235833 A, published Jan. 18, 2019, 7 pages.
Daukus, "Solvent-Based vs. Water-Based vs. 100% Solids Epoxy," Retrieved from https://www.florock.net/2018/05/solvent-based-vs-water-based-epoxy/, published May 8, 2013, 4 pages.

\* cited by examiner

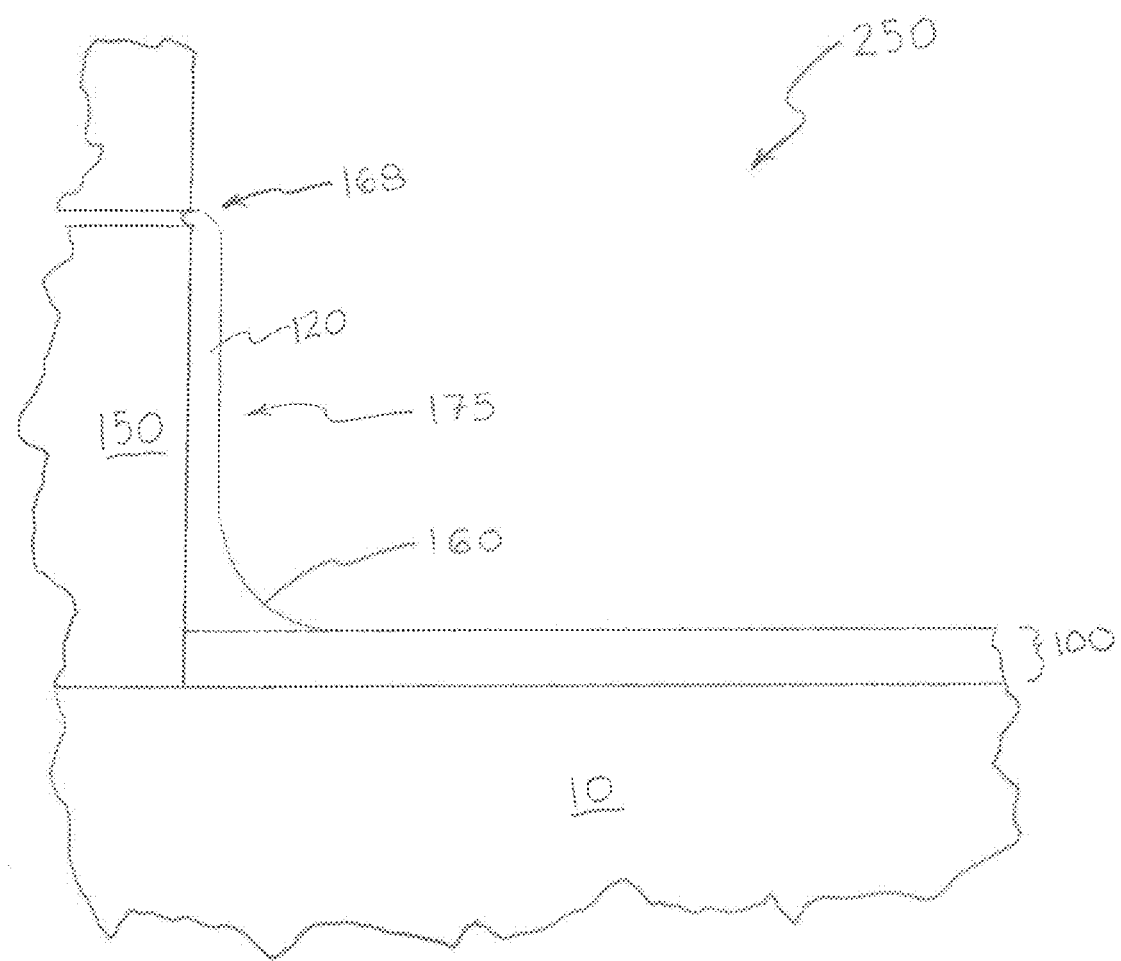

US 11,326,074 B2

SLURRY FLOOR TREATMENT TECHNOLOGY, SUCH AS CURABLE EPOXY RESIN-BASED SYSTEMS, OTHER RESIN SYSTEMS, AND RELATED RESIN COAT METHODS

RELATED APPLICATIONS

This application claims priority to U.S. Provisional Patent Application No. 62/870,963, filed Jul. 5, 2019, the entire contents of which are hereby incorporated by reference herein.

FIELD OF THE INVENTION

The present invention relates generally to floor treatments wherein a part A comprising a resin and a part B comprising a hardener are mixed together to form an activated multicomponent resin system, such as a curable epoxy resin-based system. More particularly, the invention relates to such treatments wherein a part C comprising particles is subsequently mixed together with the activated multicomponent resin system to form a slurry.

BACKGROUND OF THE INVENTION

A variety of floor coatings are used in residential, commercial, and industrial spaces. These coatings often comprise a multicomponent resin system including polyaspartic, urethane, or epoxy compounds. Once the multicomponent resin system has been applied to the floor so as to form a coating layer, particles are sometimes broadcast onto the resulting coating layer. Such broadcast methods, however, are suboptimal in terms of providing uniform particle distribution. Moreover, these methods can be time consuming and inefficient.

In other cases, a slurry is formed and applied to a floor. While known slurries may initially have relatively uniform particle distribution, the resulting slurry coating may not have substantially uniform particle distribution once the part C particles have had time to settle (e.g., once the curing is over, the particles may no longer be distributed substantially uniformly). In such cases, the particle distribution may not be substantially uniform all the way from the bottom to the top of the slurry coating. Instead, the resulting slurry coating may have a top region characterized by substantially more resin and substantially fewer particles than a bottom region of the coating. In some cases, the top region of the slurry coating may end-up being all resin, with no part C particles. It may even be necessary to sand away the resin-heavy top region of the coating to get down to where part C particles are more uniformly distributed. Thus, the parameters used for making known floor coating slurries may not be ideal, e.g., in terms of providing uniform particle distribution in the resulting coating. Furthermore, conventional slurry coatings may be suboptimal in terms of slip resistance, compressive strength, hardness, top coat adhesion, aesthetics, appearance, and/or texture.

As set forth in the present disclosure, it would be desirable to provide a method of applying a floor coat using a slurry comprising particles distributed substantially uniformly throughout the slurry. The method preferably is a non-broadcast method. It would be particularly desirable to provide an application method of this nature where the resulting coat is characterized by a substantially uniform distribution of particles all the way from the top to the bottom of the coat. It would also be particularly desirable to use a slurry comprising a multicomponent resin system having viscosity in a certain range, and in using such a slurry it would be desirable to provide a resulting coat having a substantially uniform distribution of particles. Additionally or alternatively, it would be desirable to use a slurry comprising a multicomponent resin system into which an advantageous Part C loading is mixed, and in using such a slurry it would be desirable to provide a resulting coat having a substantially uniform distribution of particles.

Further, it would be desirable to provide a floor that has a floor substrate bearing a slurry coat with an advantageous Part C loading. In some cases, it would be desirable to provide a floor that has a floor substrate bearing a slurry coat and a top coat, where the top coat provides advantageous adhesion to the slurry coat. Additionally or alternatively, it would be desirable to provide a floor that has a floor substrate bearing a floor coating comprising a slurry coat, where the floor coating has an advantageous coefficient of friction.

Still further, it would be desirable to provide advantageous methods for repairing a slurry coat.

SUMMARY OF THE INVENTION

Certain embodiments of the invention provide a method of treating a floor with a curable epoxy resin-based system. In the present embodiments, the method includes mixing together a Part A comprising an epoxy resin and a Part B comprising a hardener to form an activated multicomponent resin system. Preferably, the activated multicomponent resin system has a viscosity in a range of 900-1,200 centipoise. The method further includes mixing a Part C comprising particles (e.g., plastic particles) into the activated multicomponent resin system to form a slurry, spreading the slurry over a floor to form a slurry coat, and allowing the slurry coat to cure. Before and after the slurry coat has cured, it has particles of the Part C distributed substantially uniformly throughout.

In some embodiments, the invention provides a method of treating a floor. The method includes mixing together a Part A comprising a resin and a Part B comprising a hardener to form an activated multicomponent resin system. The activated multicomponent resin system preferably has a viscosity in a range of 900-1,200 centipoise. The method further includes mixing a Part C comprising particles (e.g., plastic particles) into the activated multicomponent resin system to form a slurry, spreading the slurry over a floor to form a slurry coat, and allowing the slurry coat to cure. Before and after the slurry coat has cured, it has particles of the Part C distributed substantially uniformly throughout.

Certain embodiments of the invention provide a method of repairing a floor that comprises a floor substrate bearing a slurry coat. The method includes (a) removing a region of the slurry coat so as to create a recessed area, (b) applying repair Part C particles onto the recessed area, (c) filling the recessed area with a repair slurry, and (d) allowing the repair slurry to cure.

Other embodiments provide a floor comprising a floor substrate bearing a slurry coat. The slurry coat has a bottom interface and a top interface. The slurry coat has particles (e.g., plastic particles) of a Part C distributed substantially uniformly from the bottom interface to the top interface. Preferably, the slurry coat is characterized by a loading of the Part C in a range of 11-13 pounds/gallon.

Some embodiments of the invention provide a method of treating a floor. The method includes mixing together a Part A comprising a resin and a Part B comprising a hardener to form an activated multicomponent resin system. The method further includes mixing a Part C comprising particles (e.g., plastic particles) into the activated multicomponent resin system to form a slurry, spreading the slurry over a floor to form a slurry coat, and allowing the slurry coat to cure. Before and after the slurry coat has cured, it has particles of the Part C distributed substantially uniformly throughout. In the present method, the step of mixing the Part C into the activated multicomponent resin system to form the slurry preferably is characterized by a loading of the Part C in a range of 11-13 pounds/gallon.

In other embodiments, the invention provides a floor comprising a floor substrate bearing a slurry coat and a top coat over the slurry coat. The top coat has an adhesion to the slurry coat of greater than 400 psi.

Some embodiments of the invention provide a floor comprising a floor substrate bearing a floor coating. The floor coating includes a slurry coat and has a static coefficient of friction of greater than 0.50.

BRIEF DESCRIPTION OF THE DRAWINGS

FIG. 11 is a broken-away schematic cross-sectional image of a wall-floor corner section comprising a cove adjacent a floor coating.

DETAILED DESCRIPTION OF PREFERRED EMBODIMENTS

Figure 1:
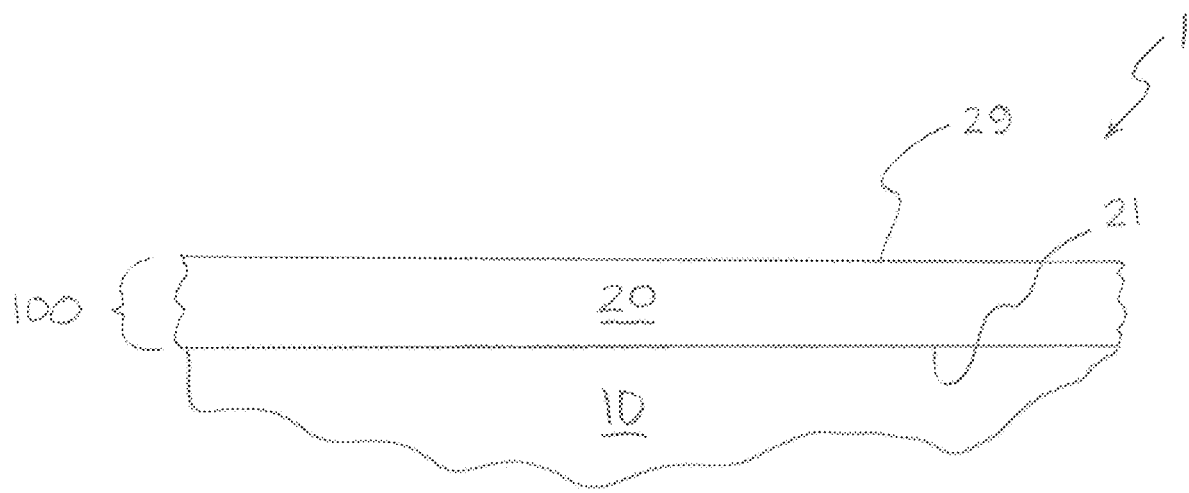
FIG. 1 is a broken-away schematic cross-sectional view of a coated floor comprising a floor substrate bearing a floor coating in accordance with certain embodiments of the present invention.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

The invention provides a method for treating (e.g., coating) a floor. The floor may be located in any of a wide variety of facilities, such as pharmaceutical and life science campuses, animal facilities (e.g., a veterinary office, an animal shelter/kennel, or a pet training facility), athletic arenas or stadiums (e.g., concourses, hallways and other walkways, locker rooms, or restrooms), auditoriums, automotive facilities (e.g., a car dealership showroom, an automobile assembly line, or an automobile repair facility), aviation or aerospace facilities (e.g., a hangar or another facility where aircraft are stored, repaired, or both), schools and universities (e.g., a hallway, classroom, cafeteria, or restroom), manufacturing facilities, police and fire stations, detention and public safety facilities, as well as other government and municipal buildings, food and beverage plants (e.g., walkways and clean areas), grocery stores and other retail locations, health care facilities (e.g., a doctor's office, clinic, hospital or research campus), nursing homes, garages and parking decks, museums, restaurants, and warehouses.

The floor can comprise a floor substrate 10, which may comprise concrete, although other suitable floor substrates can also be used. A person of ordinary skill in the present technology area will appreciate that the floor substrate 10 may in some cases be, for example, a properly reinforced wood floor.

Preparation

Some preparation of the floor substrate 10 can optionally be performed. In cases where the floor substrate 10 comprises concrete, it is desirable to ensure the concrete is fully cured. It is also preferable to make sure the surface is clean and passes the well-known moisture vapor transmission test. Furthermore, it may be desirable to perform a conventional abrasive blast or mechanical abrasion of a concrete floor to remove loose, delaminated, and damaged concrete, dirt, dust, debris, oil, grease, curing agents, bond breakers, paint, coatings, sealers, silicones, and other surface contaminants that could adversely affect application of the flooring system.

If the floor substrate 10 has cracks, it will be preferable to fill the cracks before applying the coating 100. Conventional crack filler materials and methods can be used. For example, the part A and part B of a conventional epoxy-based crack filler can be mixed for a conventional time (such as 2-4 minutes) and then applied into the crack using a trowel or the like.

In some cases, the present slurry is applied to the floor substrate 10 without first patching divots (e.g., "pop-outs" or "spawls") in the floor substrate 10. Applicant has discovered parameters that surprisingly make it possible to apply the present slurry over an area of the floor substrate 10 that has a divot (optionally a divot having dimensions within any one or more of the ranges noted in the immediately following paragraph), as well as over the rest of the floor substrate 10, without first patching the divot, and to obtain a slurry coat that is level (or "flush"), or at least substantially level, with areas of the slurry coat adjacent to the divot region. Thus, in certain embodiments, the method is devoid of patching or otherwise filling any divots in the floor substrate 10 before applying the slurry so as to form the slurry coat 20 on the floor substrate. In such cases, the application method may involve applying the slurry directly onto a floor substrate that has one or more divots, such that in so doing, the slurry flows directly into one or more divots so as to form a resulting coating that is at least substantially level over the divot(s) as well as over areas of the slurry coat adjacent to, and/or spaced from, the divot region.

In some embodiments, the divot noted above has a depth of at least 1/16 inch, at least 1/8 inch, at least 1/6 inch, or even at least 1/4 inch. In some cases, the floor substrate 10 has one or more (optionally a plurality of) divots having a depth in a range of at least 1/16 inch but less than 3/4 inch, such as at least 1/8 inch but less than 0.6 inch, or at least 1/8 inch but less than 1/2 inch, such as at least 1/8 inch but not more than 1/4 inch. It is to be appreciated that a given floor substrate 10 may initially have one or more divots in any of these ranges, optionally together with one or more larger or smaller divots. In other cases, the floor substrate 10 may be essentially free of (e.g., devoid of) divots.

In many cases, it will be preferable not to separately fill any divot having a depth of less than 1/4 inch. It may be preferable to separately fill any divots having a depth of 1/4 inch or greater.

Primer

A primer can optionally be deposited on the floor substrate before applying the slurry. If desired, a primer can be applied to the prepared surface of the floor substrate 10 so as to effectively seal and strengthen the prepared surface and to improve adhesion with the subsequently applied slurry coat 20. When provided, the primer can be selected from a variety of conventional primers. The optional primer can be applied by roller, brush, or spraying (e.g., airless spraying or conventional air spraying). The thickness of the resulting primer layer 15 can be, for example, 3 to 24 mils. One suitable example is a conventional fast-drying epoxy primer applied at a thickness in the noted range using any of the conventional application techniques noted in this paragraph.

In some cases where a primer is used, the primer is applied to the floor substrate 10 without first patching one or more divots present in the floor substrate 10. In such cases, the floor substrate has one or more divots, optionally with dimensions in any one or more of the ranges noted above. In such cases, the method can sometimes be devoid of patching or otherwise filling the divots (this is preferred for divots having a depth of less than 1/4 inch) before applying the primer. Thus, the application method may involve applying the primer directly onto a floor substrate that has one or more divots, such that in so doing, the primer flows directly into the one or more divots. Following any curing of the applied primer layer 15, the slurry coat 20 is applied over the primer layer so as to form a resulting coating that is at least substantially level over the divot(s) as well as over areas of the slurry coat adjacent to, and/or spaced from, the divot region(s). If an optional top coat is subsequently applied, it too will be substantially level over the divot(s) and the adjacent areas. Thus, the exposed top interface of the floor coating 100 at the divot region(s) will be flush, or at least substantially flush, with adjacent areas of the exposed top interface of the floor coating.

Figure 2:
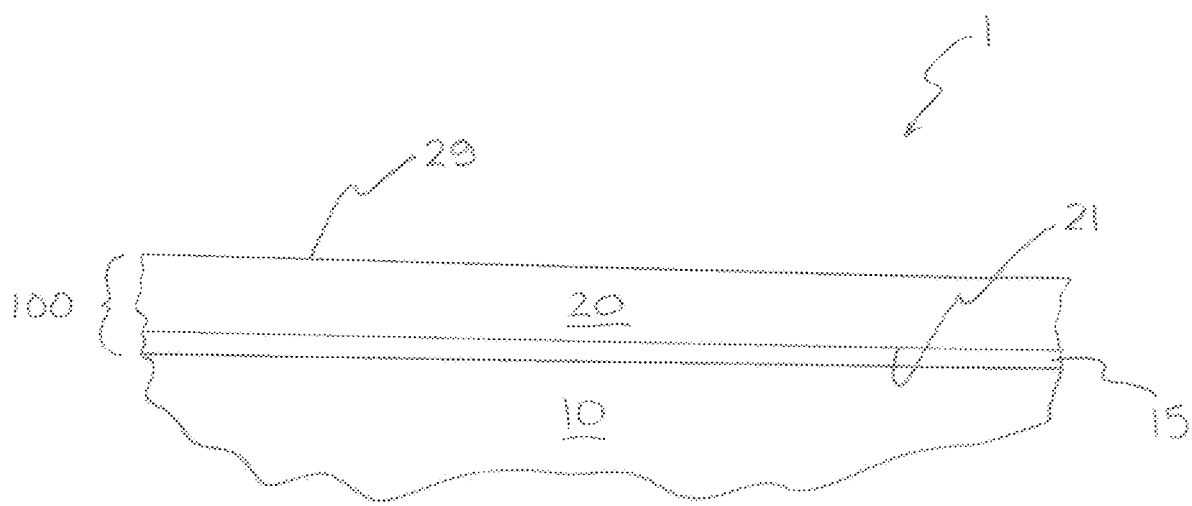
FIG. 2 is a broken-away schematic cross-sectional view of a coated floor comprising a floor substrate bearing a floor coating in accordance with other embodiments of the invention.
Figure 4:
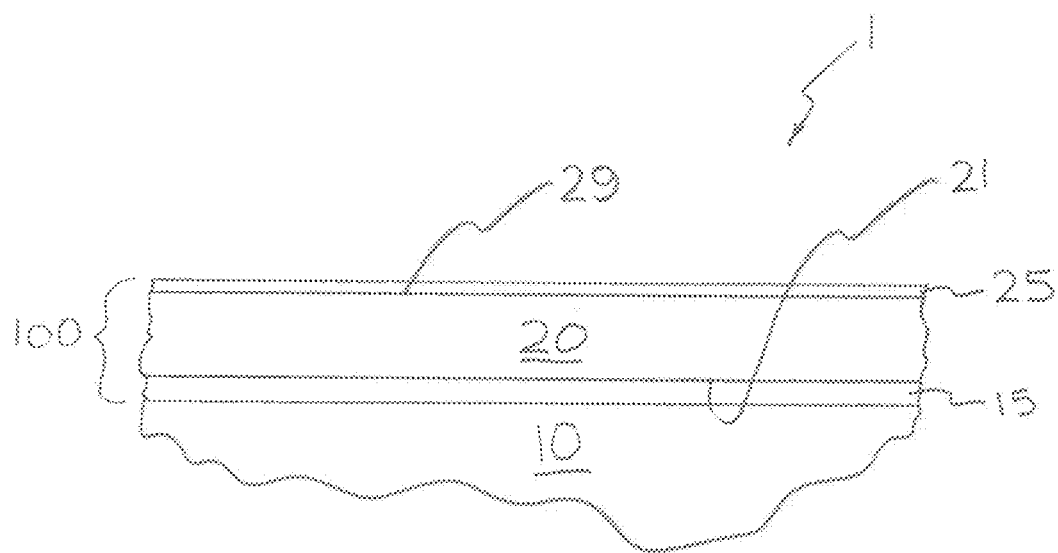
FIG. 4 is a broken-away schematic cross-sectional view of a coated floor comprising a floor substrate bearing a floor coating in accordance with yet other embodiments of the invention.

FIGS. 2 and 4 show non-limiting examples of embodiments where the floor coating 100 includes a primer layer 15. In other cases, no primer is applied, but the present slurry coat 20 is applied over a previously coated or sealed substrate, or over a non-porous substrate. In some cases, the present slurry coat 20 is applied over an existing coating has been sanded down.

In embodiments where a primer layer 15 is included, the floor coating 100 preferably is devoid of (i.e., does not include) a pigmented color coat between the primer layer 15 and the slurry coat 20. Moreover, in such embodiments, there may simply be no layer between the primer layer 15 and the slurry coat 20. Reference is made to FIGS. 2 and 4.

In some preferred embodiments, the floor coating 100 has no more than one layer (i.e., the optional primer layer 15) beneath the slurry coat 20. This can optionally be the case for many embodiments of the present disclosure. Reference is made to FIGS. 1-4.

In many cases, the floor coating 100 will have a bottom interface in contact with the floor substrate 10 and an exposed top interface. This can be appreciated by referring to FIGS. 1-4, which show the floor coating 100 having an exposed top interface (or "face").

Activation

The floor treatment (e.g., coating) method of the invention comprises mixing together a Part A comprising a resin and a Part B comprising a hardener to form an activated multi-component resin system. The resin of the Part A can comprise epoxy, polyaspartic, or urethane. In some cases, the resin of the Part A comprises an epoxy. In such cases, the epoxy comprises (e.g., is formed of) a bisphenol A epoxy resin, a novolac epoxy resin, and/or a bisphenol F epoxy resin. The Part A can be formed of just one of these epoxy resins or it can be a blend of two or more such epoxy resins.

In one group of embodiments, the Part A comprises a bisphenol A epoxy resin. Suitable resin of this nature can be obtained commercially from a variety of suppliers, such as Dow Corning Corporation, of Auburn Mich., U.S.A., and Hexion Inc., of Columbus Ohio, U.S.A. One suitable example is the D.E.R.™ 331™ liquid epoxy resin of Dow Corning Corporation. Another suitable example is the EPON™ resin 828 of Hexion Inc.

With respect to the Part B, the hardener (or "curing agent") preferably is a polyamine hardener, such as a polyetheramine, e.g., a polypropylene glycol based polyetheramine. One suitable hardener is the Jeffamine® D-230 hardener, which is available commercially from Huntsman Corporation, of The Woodlands, Tex., U.S.A. While a polyamine hardener is preferred, other types of hardener may alternatively be used.

Preferably, the Part A, Part B, or both further include one or more additives. Thus, the Part A may be formed by mixing the resin together with one or more additives. Additionally or alternatively, the Part B may be formed by mixing the hardener together with one or more additives. The one or more additives included in the Part A, Part B, or both may comprise one or more of an accelerator, a leveling agent, an air release agent (or "defoamer"), and an UV additive. In some cases, an additive that serves multiple purposes is included. For example, a single additive may serve as both a defoamer and a leveling additive.

When provided, the accelerator can optionally comprise a nonylphenol. Suitable accelerator of this nature is available commercially from various well-known suppliers, such as Dover Chemical Corporation, of Dover Ohio, U.S.A. The accelerator can be included in the Part A, Part B, or both. In some cases, the same accelerator is included both in Parts A and B.

When provided, the leveling agent can comprise various materials. In some cases, a nonreactive silicone glycol copolymer surfactant is used, such as the Dow Corning® 57 additive. The leveling agent can optionally also provide air release properties. In some cases, a copolyacrylate is used, such as the PERENOL® F-40 product from BASF Corporation, of Ludwigshafen, Germany.

When provided, the defoamer can optionally comprise a copolyacrylate or a siloxane. In some cases, the defoamer also serves as a leveling agent. As noted above, a copolyacrylate can be used, such as the PERENOL® F-40 product. In other cases, the defoamer can comprise a 100% active alkyl methyl siloxane, such as the Dow Corning® 56 additive. Another option is a silicone-free composition of foam-destroying polymers, such as the BYK®-057 additive.

When provided, the UV additive can optionally comprise a hindered-amine light stabilizer, an ultraviolet light absorber, or both. One suitable example of a hindered-amine light stabilizer is the Tinuvin® 292 product from BASF Corporation, of Ludwigshafen, Germany. One suitable example of an ultraviolet light absorber is the Tinuvin® 400 product, which is also from BASF Corporation. Various other UV additives can optionally be added to improve light stability.

The Part A and Part B are mixed together to form an activated multicomponent resin system. As a non-limiting example, a mixing period of roughly 2 minutes may be used. The mix ratio can be varied depending on the components used and the intended application. As will be understood by a person of ordinary skill in this area of technology, the components preferably are present in stoichiometric amounts, so that the Part A and Part B reaction groups line-up with one another. In some cases where the Part A comprises epoxy, the mix ratio of the Part A to Part B (resin to hardener) is between 2:1 and 4:1, such as between 2.5:1 and 3.5:1, e.g., between 2.75:1 and 3.25:1, such as 3:1 (volume to volume). For example, a 3:1 mix ratio can reflect mixing 1.5 gallons of Part A with 0.5 gallon of Part B. It is to be appreciated, however, that the mix ratios noted in this paragraph are by no means limiting.

The activated multicomponent resin system generally has a viscosity in a range of 300-1,200 centipoise. In some cases, the viscosity is greater than 900 centipoise, or even greater than 950 centipoise. In certain preferred embodiments, the viscosity is in a range of 900-1,200 centipoise, or perhaps more preferably 925-1,100 centipoise, e.g., 950-1,050 centipoise, such as 1,000 centipoise. Applicant has discovered that surprising results can be obtained when using such a viscosity, e.g., in terms of providing uniform distribution of Part C particles all the way to the top of the resulting slurry coat. The viscosity can be determined in accordance with ASTM D2196, the salient teachings of which are hereby incorporated herein by reference. To measure the viscosity of the activated multicomponent resin system, a Cannon® mono 22 viscometer can be used, with spindle 63 at a speed of 20 rpm.

Loading

The method involves mixing a Part C comprising particles into the activated multicomponent resin system to form a slurry (or "mixture"). The mixing is performed so as to distribute the Part C particles substantially uniformly throughout the multicomponent resin system. The resulting slurry preferably is characterized by a loading of the Part C in a range of less than 15 pounds/gallon, such as 10-14 pounds/gallon, perhaps more preferably in a range of 11-13 pounds/gallon, and perhaps optimally in a range of 12-13 pounds/gallon, such as 12.5 pounds/gallon. These loading numbers refer to the weight of the Part C relative to the volume of the activated multicomponent resin system. The Part C may comprise plastic particles. In addition to using a loading ratio within any one or more (e.g., all) of the ranges noted in this paragraph, the activated multicomponent resin system into which the Part C particles are loaded preferably has a viscosity within any one or more (e.g., all) of the ranges noted in the immediately preceding paragraph. In some cases, the viscosity of the activated multicomponent resin system is in a range of 900-1200 centipoise and the subsequent loading is in a range of less than 15 pounds/gallon, such as 11-13 pounds per gallon. This can optionally be the case for any embodiment of the present disclosure. Suitable Part C can be obtained commercially from ACS International Products LP of Tucson, Ariz., U.S.A., notably their Part C designed for flooring.

As a non-limiting example, a mixing period of roughly 2 minutes can be used. After mixing the Part C particles into the activated multicomponent resin system, the resulting slurry has particles of the Part C distributed substantially uniformly throughout. In some cases, the Part C is devoid of granite.

The viscosity of the resulting slurry (defined herein as the "blended viscosity") can optionally be in a range of 20,000 to 40,000 centipoise, e.g., 25,000 to 35,000 centipoise, such as about 30,000 centipoise. This can optionally be the case for any embodiment of the present disclosure. This higher viscosity can be measured with a Brookfield® RVF viscometer, using spindle TC at a speed of 4 rpm.

Whether or not a primer layer 15 has been applied to the floor substrate 10, the slurry is deposited (e.g., spread) over the floor substrate to form a slurry coat 20. This can be done, for example, by using a notched or flat trowel or rake and thereafter back rolling the coating with a porcupine roller.

The present method preferably is devoid of any broadcasting step. Thus, the present method can be a non-broadcast method of forming a floor coating 100. For example, particles preferably are not scattered (e.g., thrown or otherwise deposited) onto a top interface 29 of the slurry coat 20. This preferably is the case for any embodiment of the present disclosure. In some cases, the method is also devoid of scattering (e.g., throwing or otherwise depositing) particles onto a top interface of an optional top coat 25. Thus, in some cases, the method is devoid of scattering particles onto a top interface of the floor coating 100.

The slurry coat is allowed to cure. The cure time may be, for example, in a range of 1-16 hours, such as 12-16 hours.

Preferably, the cured slurry coat has a compressive strength of 11,000 psi or greater, more preferably 12,000 psi or greater, and perhaps optimally 13,000 psi or greater. In some cases, the compressive strength is in a range of from 12,000 psi to 15,000 psi, or from 13,500 psi to 15,500 psi, such as 14,000 psi. The working example detailed below has a compressive strength of about 14,000 psi. Compressive strength can be determined in accordance with ASTM C579, the salient contents of which are hereby incorporated by reference herein.

Additionally or alternatively, the cured slurry coat can optionally have a Shore A hardness in a range of 80-100, or 85-95, such as 90. The working example detailed below has a Shore A hardness of about 90. The Shore A hardness can be determined in accordance with ASTM D2240, the salient contents of which are hereby incorporated by reference herein.

Once cured, the slurry coat 20 can optionally be sanded. If a top coat 25 is to be applied over the slurry coat 20, then the top interface 29 of the slurry coat preferably is sanded so as remove imperfections (e.g., bubbles and debris). If a top coat 25 will not be applied over the slurry coat 20, then the sanding step is more likely to be omitted, since normal wear of the floor coating (e.g., from pedestrian traffic) will tend to remove imperfections. Thus, in certain embodiments, the top interface 29 of the slurry coat 20 is left exposed, and the method is devoid of any sanding or grinding step performed on the top interface of the slurry coat.

A person of ordinary skill in the present technology area will appreciate that a slurry coat that has been sanded to remove a top portion of its thickness is characterized by a certain generally flat surface topography (defined herein as a "sanded topography"). In some embodiments of the present invention (e.g., where no top coat 25 is provided), the slurry coat 20 is devoid of a sanded topography (e.g., is devoid of sanding marks, which may only be microscopic). In contrast, certain slurry coatings may suffer from significant particle settling, such that a top region of the slurry coating is predominantly resin, and thus may need to be sanded down considerably to remove the top region.

Figure 5:
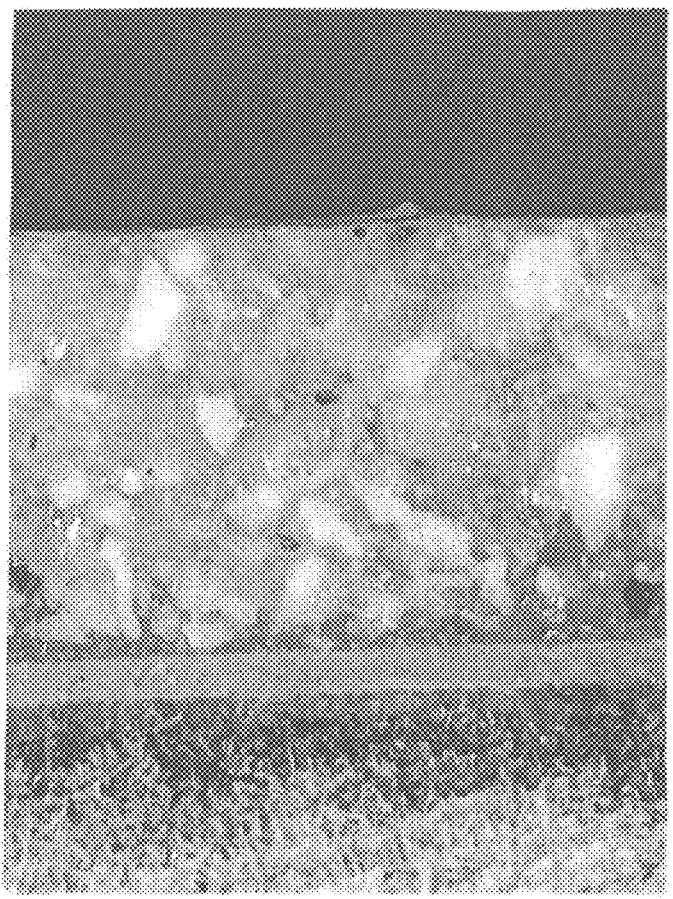
FIG. 5 is a cross-sectional image of a floor coating comprising a slurry coat in accordance with some embodiments of the invention.
Figure 6:
FIG. 6 is a cross-sectional image of a floor coating comprising a slurry layer with a top region having substantially fewer Part C particles than do middle and bottom regions of the slurry layer.

Before and after the slurry coat has cured, it has particles of the Part C distributed substantially uniformly throughout. The slurry coat 20 has a bottom interface 21 and a top interface 29, and the slurry coat is characterized by particles (e.g., plastic particles) of the Part C being distributed substantially uniformly all the way to the top interface (e.g., entirely from the bottom interface to the top interface) both before and after the slurry coat has cured. This is shown in FIG. 5. In contrast, FIG. 6 shows a slurry layer 20' where the top 10-20% of the layer thickness is predominantly or entirely formed of resin, due to the Part C particles having settled substantially. In FIGS. 5 and 6, a wood test substrate 10' is used.

The slurry coat 20 will generally have a thickness in a range of 40 mils to 1 inch, preferably from 40 mils to ¾ inch, or from 40 mils to ½ inch. In certain embodiments, the slurry coat 20 has a thickness of greater than 120 mils. Due to its composition, even when the slurry coating 20 is applied at such a thickness, it has particles of the Part C distributed substantially uniformly throughout (e.g., all the way to the top interface). In some embodiments of this nature, the thickness of the slurry coat 20 is greater than 120 mils but less than 1 inch, less than ½ inch, or even less than ⅓ inch.

The present slurry has surprising self-leveling properties. For example, in some cases, the floor substrate 10 includes a divot, the divot has a depth of at least 1/16 inch (or at least ⅛ inch, such as between ⅛ inch and ¼ inch), and the deposition of the slurry over the floor substrate to form the slurry coat 20 includes depositing some of the slurry into the divot. In such cases, the slurry coat 20 fills the divot, and in some cases entirely fills the divot. As noted above, the method preferably is devoid of separately/individually filling any divots having a depth of less than ¼ inch prior to spreading the slurry over the floor. In some cases, the slurry coat is applied over such divot area(s) after applying a primer over such divot area(s) and over the rest of the floor substrate, as already explained. Thus, the primer layer and the slurry coat may collectively fill such divot(s). The resulting slurry coat 20 has a region that is located in and over the divot and that is defined as a divot region. The composition of the present slurry provides for the divot region of the resulting slurry coat 20 to be level with adjacent regions of the slurry coat, which are not located over the divot. Additionally or alternatively, the composition of the slurry preferably provides that the divot region of the resulting slurry coat 20 has a color substantially matching that of adjacent regions of the slurry coat. More generally, the composition of the slurry preferably provides for the divot region of the resulting slurry coat 20 to have a visual appearance substantially matching that of adjacent regions of the slurry coat.

Slip Resistance

In certain embodiments, the slurry coat 20 has a static coefficient of friction ("COF") of greater than 0.50. In some cases, the static coefficient of friction is in a range of between 0.50 and 0.90, such as between 0.50 and 0.82, or even between 0.50 and 0.60. The James Machine test method of ASTM D2047-17 can be used to determine the static COF. The salient teachings of this standard are hereby incorporated herein by reference.

It has surprisingly been discovered that by including a polyacrylic additive in the Part A, Part B, or both, the slip resistance of the slurry coat 20 can be increased. In many cases, additives do not help with slip resistance, but rather cause slip. In contrast, with the present slurry coat 20, Applicant has discovered that a polyacrylate additive can provide a surprising increase in slip resistance. One suitable example is the BYK®-354 additive, which is a solution of a polyacrylate. The BYK®-354 additive is available commercially from BYK USA Inc., of Wallingford, Conn., U.S.A.

In certain embodiments, the amount of polyacrylate additive is from 0.25% to 1.25% (by weight), or perhaps more preferably from 0.5% to 1.0%, of the total resin for the activated multicomponent resin system (i.e., relative to the total weight of Parts A and B). In one non-limiting example, the level of polyacrylate additive used is about 0.75% by weight relative to the total weight of the Parts A and B.

Top Coat

Figure 3:
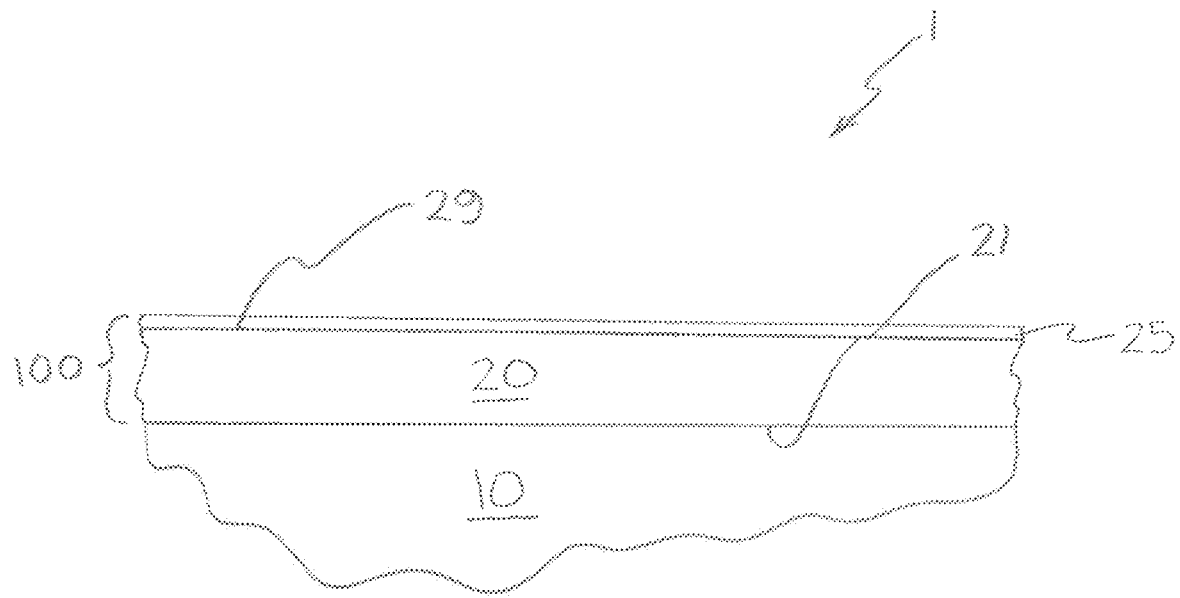
FIG. 3 is a broken-away schematic cross-sectional view of a coated floor comprising a floor substrate bearing a floor coating in accordance with still other embodiments of the invention.

The method of the present invention can optionally further include depositing a top coat 25 over the slurry coat 20. FIGS. 3 and 4 show non-limiting examples of embodiments wherein a top coat 25 is provided. When provided, the top coat 25 can optionally have a thickness in a range of ½ mil-10 mils, or even thicker in some cases where the top coat comprises polyaspartic resin. In certain embodiments, the top coat 25 has a thickness of 3-5 mils. In some embodiments of this nature, the top coat 25 comprises polyurethane. Various materials can be used for the optional top coat. In one non-limiting example, a top coat comprising polyurethane and glass beads (or aluminum oxide particles) is used. While the optional top coat may be an activated multicomponent system, this is by no means required. As noted above, in cases where a top coat 25 is provided over the slurry coat 20, the top interface 29 of the slurry coat preferably is sanded before applying the top coat. This can be done to remove imperfections before applying the top coat.

In some cases, the top coat 25 has an adhesion strength to the slurry coat 20 of greater than 400 pounds/inch$^2$ ("psi"), or greater than 500 psi, or even greater than 700 psi. ASTM Test Method D7234 can be used to determine this adhesion strength. The salient teachings of this ASTM standard are hereby incorporated herein by reference. The device can be an Elcometer® 106 adhesion tester. The fixture can be a 50 mm diameter fixture.

When a top coat 25 is provided, it preferably has a static COF of greater than 0.50. In some cases, the static COF of the top coat 25 is in a range of between 0.50 and 0.90, such as between 0.50 and 0.82, or even between 0.50 and 0.60.

Thus, the resulting floor coating 100, whether or not it includes a top coat 25, preferably has a static COF of greater than 0.50. In some cases, the static COF of the floor coating 100 is in a range of between 0.50 and 0.90, such as between 0.50 and 0.82, or even between 0.50 and 0.60.

The resulting floor coating 100 preferably does not have more than three layers. In more detail, the floor coating 100 preferably consists of one, two, or three layers, e.g., an optional primer layer 15, a slurry coat 20 layer, and an optional top coat 25 layer. In embodiments where both a primer layer and a top coat are provided, the floor coating preferably consists of a primer layer, the slurry coat, and a top coat.

Coated Floor

The invention also provides a coated floor 1 comprising a slurry coat 20. The slurry coat 20 has a bottom interface 21 and a top interface 29. The slurry coat 20 has particles (e.g., plastic particles) of a Part C distributed substantially uniformly from the bottom interface 21 to the top interface 29. The slurry coat 20 preferably is characterized by a loading of the Part C in a range of less than 15 pounds/gallon, such as 10-14 pounds/gallon, perhaps more preferably 11-13 pounds/gallon, and perhaps optimally 12-13 pounds/gallon, such as 12.5 pounds/gallon. In some cases, the slurry coat 20 is devoid of granite.

The slurry coat 20 has a thickness in a range of 40 mils to 1 inch, such as from 40 mils to ½ inch. In some cases, the slurry coat 20 has a thickness of greater than 120 mils. In such cases, the thickness of the slurry coat 20 can optionally be less than ½ inch, or even less than ⅓ inch.

A primer layer 15 can optionally be located between the slurry coat 20 and the floor substrate 10. When provided, the primer layer 15 can be of the nature described above.

In the present coated floor embodiments, the slurry coat 20 preferably is a product of a process comprising: (a) mixing together a Part A comprising a resin and a Part B comprising a hardener to form an activated multicomponent resin system, the activated multicomponent resin system having a viscosity in a range of 300-1,200 centipoise, preferably 900-1,200 centipoise, perhaps more preferably 925-1,100 centipoise, and perhaps optimally 950-1,050 centipoise, such as 1,000 centipoise, (b) mixing a Part C comprising particles into the activated multicomponent resin system to form a slurry, preferably with a loading of the Part C in a range of 10-14 pounds/gallon, perhaps more preferably 11-13 pounds/gallon, and perhaps optimally 12-13 pounds/gallon, such as 12.5 pounds/gallon, (c) depositing the slurry to form the slurry coat, and (d) allowing the slurry coat to cure, such that before and after the slurry coat has cured it has particles of the Part C distributed substantially uniformly throughout. This process can involve the particular components/ingredients and method step details described above.

In one group of the present embodiments, the coated floor 1 comprises a floor substrate 10 having a divot. The divot, for example, can have a depth of at least 1/16 inch (e.g., at least ⅛ inch), while preferably being less than ¼ inch. The slurry coat 20 fills the divot, and in some cases entirely fills the divot. The slurry coat 20 has a region that is located in and over the divot and that is defined as a divot region. The divot region of the slurry coat 20 preferably is level with adjacent regions of the slurry coat that are not located over the divot. In such cases, the divot region of the slurry coat 20 is devoid of a divot in the top interface 29. Additionally or alternatively, the divot region preferably has a color substantially matching that of adjacent regions of the slurry coat not located over the divot. More generally, the divot region preferably has a visual appearance substantially matching that of adjacent regions of the slurry coat 20 not located over the divot. In such cases, the divot region of the slurry coat 20 does not have, for example, a color change compared to adjacent regions of the slurry coat, or a shiny spot of clear resin.

In the present embodiments, the coated floor 1 can optionally further include a top coat 25 located over the slurry coat 20. When provided, the top coat 25 preferably has an adhesion to the slurry coat 20 of greater than 400 psi. Additionally or alternatively, the top coat 25 preferably has a static coefficient of friction of greater than 0.50, e.g., in a range of between 0.50 and 0.90, such between 0.50 and 0.60.

The floor coating 100 preferably does not have more than three layers. In more detail, the floor coating 100 preferably consists of one, two, or three layers, e.g., an optional primer layer 15, a slurry coat 20 layer, and an optional top coat 25 layer.

In certain embodiments, the floor coating 100 has a total thickness of less than 100 mils, such as in a range of 70-90 mils. It is to be appreciated, however, that the present slurry coat compositions enable advantageous applications, not only within these ranges, but also at far larger thicknesses or smaller thicknesses.

Repair

Figure 7:
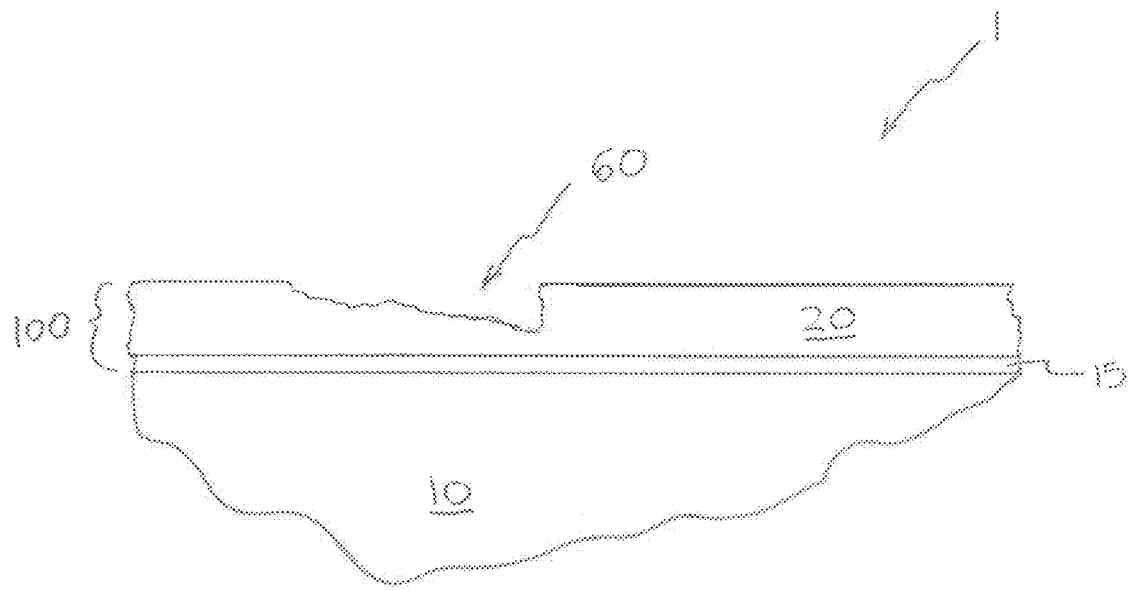
FIG. 7 is a broken-away schematic cross-sectional image of a coated floor comprising a floor substrate bearing a damaged floor coating.

In one group of embodiments, the invention provides a method of repairing a floor. The floor comprises a floor substrate 10 bearing a slurry coat 20. The slurry coat 20 may have been damaged by moving equipment or other items across the floor, striking the floor with an object, dropping something on the floor, etc. Thus, in the present embodiment group, there is a gouge, scrape, or other localized damage (which may comprise a recessed area) 60 in the slurry coat 20 prior to performing the repair method. Reference is made to FIG. 7.

It is to be appreciated that, after performing the present repair method, the floor coating 100 at the location where the gouge or other recessed area 60 had been will be level or at least substantially level with adjacent areas of the coating.

The present repair method generally includes (a) removing a region of the slurry coat 20 so as to create a recessed area 70, (b) applying repair Part C particles 80 onto the recessed area 70, (c) filling the recessed area 70 with a repair slurry 90, and (d) allowing the repair slurry 90 to cure.

Figure 8:
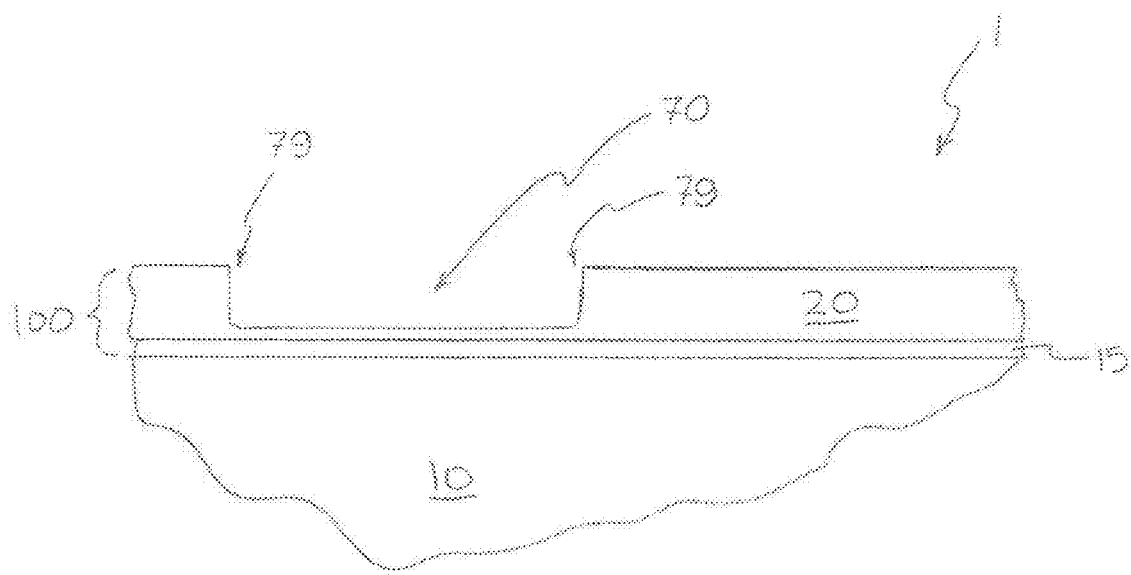
FIG. 8 is a broken-away schematic cross-sectional image of the coated floor of FIG. 7 after forming a recessed area in the floor coating, pursuant to a repair method of the invention.

The region of the slurry coat 20 that is to be removed is beneath and/or surrounds the gouge or other localized damage 60. This can be appreciated by comparing FIGS. 7 and 8. The step of removing such a region of the slurry coat 20 may involve, for example, a routing operation (i.e., operating a router to grind and/or cut away a region of the slurry coat that is beneath and/or surrounds the localized damage). Once the recessed area 70 has been created, any loose pieces of the slurry coat material preferably are removed from the recessed area (e.g., by vacuuming or otherwise removing the resulting dust and debris).

Figure 9:
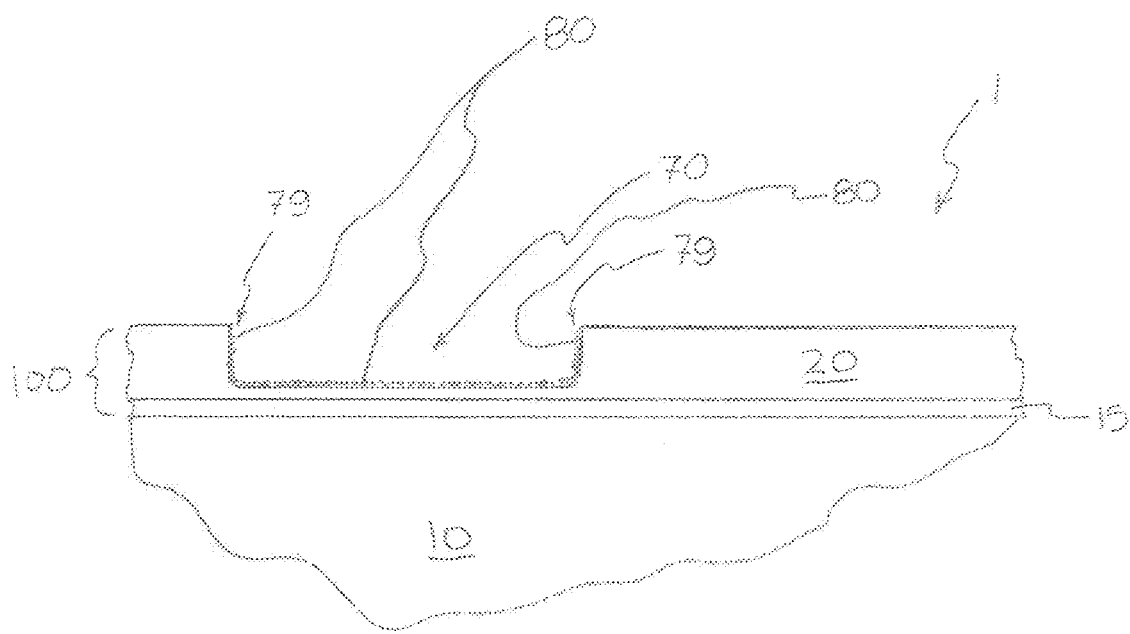
FIG. 9 is a broken-away schematic cross-sectional image of the coated floor of FIG. 8 after applying repair Part C particles to the recessed area in the floor coating, pursuant to the repair method of the invention.

Repair Part C particles 80 are then applied onto the recessed area 70. This step may involve dusting the repair Part C particles 80 onto the recessed area 70. For example, a worker may lightly dust the recessed area 70 to provide a thin layer of Part C powder/particles 80. As shown in FIG. 9, while the Part C powder preferably is applied (e.g., dusted) onto a perimeter 79 of the recessed area 70, some of the Part C powder may be simultaneously dusted onto the bottom of the recessed area 70. While this is not required, it is an option. Moreover, as will be appreciated, some of this may occur inadvertently even if one intends to dust only the perimeter 79.

The repair Part C particles 80 preferably have the same or substantially the same composition, appearance, or both as the Part C particles that were originally used to create the slurry coat 20. For example, the repair Part C particles 80 preferably are particles of the same Part C that was originally used to create the slurry coat 20. In some cases, the repair Part C particles 80 may even be from the same batch as the Part C particles that were originally used to create the slurry coat 20. In the present step, the recessed area 70 preferably is dusted or otherwise covered with only the repair Part C particles/powder 80.

Figure 10:
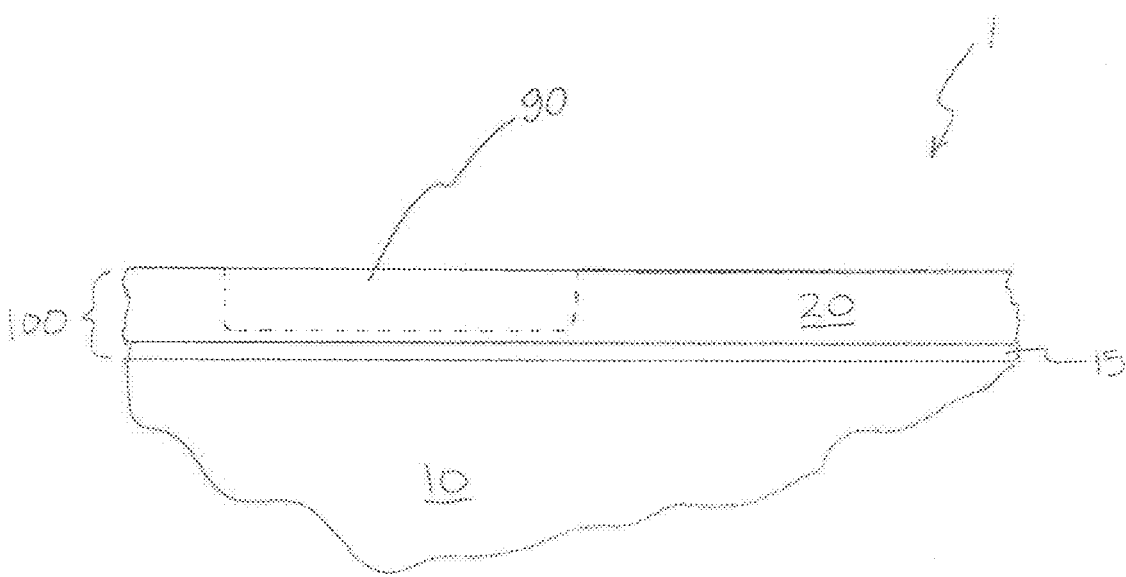
FIG. 10 is a broken-away schematic cross-sectional image of the coated floor of FIG. 9 after filling the recessed area with repair slurry, pursuant to the repair method of the invention.

The recessed area 70 is then filled with a repair slurry 90. Once the recessed area 70 has been filled with the repair slurry 90, a v-notch trowel (e.g., ⅛$^{th}$ inch v-notch trowel) can be used to groom the surface. If appropriate, the resulting surface may be sanded level/smooth once the repair slurry has cured. Thus, the repair slurry 90 preferably ends up being level with adjacent areas of the slurry coat 20. Reference is made to FIG. 10.

The repair slurry 90 used in the present repair method preferably has the same or substantially the same composition, appearance, or both as the slurry that was originally used to form the slurry coat 20. For example, the repair slurry 90 can have the same components/ingredients (e.g., the same Parts A, B, and C), and can be made using the same process, as were used to make the original slurry. Preferably, the activated multicomponent repair resin system has a viscosity in a range of 300-1,200 centipoise, such as 900-1,200 centipoise, or perhaps more preferably in a range of 925-1,100 centipoise, e.g., 950-1,050 centipoise, such as 1,000 centipoise. In addition, the loading ratio for the repair slurry 90 preferably is within one or more (e.g., all) of the loading ranges noted above. Before and after the repair slurry 90 has cured, it preferably has particles of the repair Part C distributed substantially uniformly throughout.

Thus, the present repair method preferably includes making the repair slurry 90 by: (i) mixing together a repair Part A comprising a resin and a repair Part B comprising a hardener to form an activated multicomponent repair resin system, and (ii) mixing a repair Part C comprising particles (e.g., plastic particles) into the activated multicomponent repair resin system to form the repair slurry 90.

The repair Part C particles that are mixed into the activated multicomponent repair resin system, to form the repair slurry 90, preferably have the same or substantially the same composition, appearance, or both as the repair Part C particles that were previously applied (e.g., dusted) onto the recessed area 70. In some cases, the repair Part C particles that are mixed into the activated multicomponent repair resin system (to form the repair slurry 90) are from the same batch as the repair Part C particles that are applied (e.g., dusted) onto the recessed area 70.

Once the recessed area 70 has been filled with the repair slurry 90, the repair slurry is allowed to cure. Once cured, the repair slurry 90 has a visual appearance that is the same as, or substantially matches, that of adjacent regions of the slurry coat 20. By using the present repair method, there is no resulting demarcation (e.g., no visible halo-like line or border) between the repair slurry 90 and adjacent regions of the slurry coat 20. This is as determined visually by looking (with the naked eye) at the resulting floor coating 100 from a height of six feet above the floor coating.

Instead of the repair methods just described, for smaller (e.g., bug-sized) holes, such as a pencil-eraser sized hole left from installation, the present floor coating can be readily patched with a conventional polyaspartic resin for patching. When combined with the Part C, it will make a putty-like consistency, such that one can putty the hole and then lightly sand it to readily patch the hole.

Coves

A modified slurry can be produced so as to be configured to form coves. Reference is made to FIG. 11, which shows a wall-floor corner region 250 comprising a floor coating 100 and a cove 175. Here, the modified slurry has been applied to a vertical section of wall 150, which may be defined by a wall board or concrete wall. The resulting modified slurry coat 120 extends from the floor coating 100 upwardly along the wall 150.

A radius 160 preferably connects the floor coating 100 and the cove 175. The radius of the cove profile can, for example, be in a range of from ⅜ inch to 1 inch.

While the height of the cove 175 is not strictly limited, its top end will commonly be about 4-12 inches above the floor substrate 10. In FIG. 11, the cove termination 168 comprises a mortar joint. It is to be appreciated, however, that different cove termination configurations may be used.

To produce the modified slurry, one or more additives are provided in the activated resin system (e.g., in the Part A) such that the activated resin system has a viscosity in a range of from 8,000 centipoise to 12,000 centipoise, such as about 10,000 centipoise.

The additive(s) preferably comprise (e.g., are) fibers, such as polyethylene microfibers. High density polyethylene (HDPE) fibers are advantageous. Suitable fibers of this nature are commercially available from MiniFIBERS, Inc. (Johnson City, Tenn., U.S.A.). One suitable option is their grade ESS5F SHORT STUFF® fibrillated HDPE fibers. In one example, the fibers are loaded into the Part A at a weight range of 2-4%, such as about 3.2% by weight.

Preferably, the fibers and/or other additive(s) are chosen such that they are configured to thicken the Part A without substantially changing the color or appearance. The resulting cove 175 therefore looks like the floor coating 100. The composition of the modified slurry coat 120, however, is different from the composition of the slurry coat 20.

In producing the modified slurry coat (or "cove slurry coat") 120, the rest of the process for making the slurry can be the same as that described above for slurry coat 20. For example, Part C particles (e.g., plastic particles) are mixed into the activated resin system so as to be distributed substantially uniformly throughout the slurry. Conventional methods can then be used for applying the modified slurry to the wall 150 so as to form the cove 175.

When provided, the cove 175 may have a thickness in a range of 30-125 mils. In the embodiment of FIG. 11, the thickness is greater at the radius, such as from 125 mils to 750 mils thick.

Thus, embodiments like that shown in FIG. 11 provide a wall-floor corner region 250 comprising a floor coating 100 (e.g., of the nature described elsewhere in this disclosure) adjacent a cove 175 comprising a modified slurry coat 120 of the nature just described. The slurry applied in forming the floor coating 100 has a different composition from the modified slurry applied in forming the cove 175. As noted above, the modified slurry has a much higher viscosity than the slurry used in forming the floor coating 100 (e.g., about 8,000-12,000 centipoise versus about 900-1,200 centipoise).

Example 1

In a non-limiting example, the ingredients listed below are used to make 2 gallons of resin, which is mixed with 25 pounds of part C (such that the loading is 12.5 pounds/gallon). This is applied to a cement floor area to cover about 60-80 square feet at a thickness of about 60-80 mils. Since the parts A and B are reactive, the parts are mixed up and stored separately.

| Pounds | Percent | Ingredient | Wt/gal | Volume |
|---|---|---|---|---|
| | | Part A | | |
| 10.793 | 77.398 | DER 331 | 9.650 | 1.12 |
| 2.9435 | 21.1072 | Nonylphenol (para) | 7.930 | 0.37 |
| 0.0689 | 0.4944 | Perenol F-40 | 7.700 | 0.01 |
| 0.1394 | 1.0000 | Byk 354 | 7.914 | 0.02 |
| 13.945 | 100.000 | | | 1.5 |
| | | Part B | | |
| 3.3479 | 84.167 | Jeffamine D230 | 7.910 | 0.42 |
| 0.6298 | 15.833 | Nonylphenol (para) | 7.930 | 0.08 |
| 3.98 | 100.00 | | | 0.5 |
| 17.92 | | Mix | | 2.0 |

Application: Once the cement floor area is prepped and ready for install, the resin parts A and B are mixed with a Jiffy mixer blade and slow-speed drill for 2 minutes. The viscosity is about 1,000 centipoise. The part C is then added, preferably slowly to reduce dusting and ensure incorporation into the mixed resin. The part C used here is the part C for flooring commercially available from ACS International Products LP. The part C mixing is carried out for 2 minutes, moving the mixer around to get a consistent mixture. The resulting slurry is then immediately poured in across the cement floor area to be covered. The slurry is moved around/spread over the cement floor area, for example, using a ¼ inch, V-notched trowel, e.g., held at a 45 degree angle. A porcupine roller is then rolled over the slurry to even out the material and release air. It is preferable to allow 24 hours for the material to cure. The static coefficient of friction of the resulting slurry coat is about 0.55.

While some preferred embodiments of the invention have been described, it should be understood that various changes, adaptations and modifications may be made therein without departing from the spirit of the invention and the scope of the appended claims.

What is claimed is:

1. A method of treating a floor, the method including mixing together a Part A comprising a resin and a Part B comprising a hardener to form an activated multicomponent resin system, the activated multicomponent resin system having a viscosity in a range of 900-1,200 centipoise, the method further comprising mixing a Part C comprising particles into the activated multicomponent resin system to form a slurry, spreading the slurry over a floor to form a slurry coat having a bottom interface and a top interface, and allowing the slurry coat to cure, such that before and after the slurry coat has cured it has particles of the Part C distributed substantially uniformly throughout including from the bottom interface to the top interface.

2. The method of claim 1 wherein the activated multicomponent resin system is a curable epoxy resin-based system.

3. The method of claim 1 wherein the method is devoid of any broadcasting step.

4. The method of claim 1 wherein the viscosity of the activated multicomponent resin system is in a range of 950-1,050 centipoise.

5. The method of claim 1 wherein the method of treating the floor produces a floor coating on the floor, the floor coating comprising the slurry coat, the floor coating having a bottom interface in contact with the floor and an exposed top interface, the floor coating having a total of three or fewer layers comprising an optional primer layer, the slurry coat, and an optional top coat.

6. The method of claim 1 wherein the method of treating the floor produces a floor coating on the floor, the floor coating comprising the slurry coat, the floor coating having a bottom interface in contact with the floor and an exposed top interface, the floor coating consisting of a primer layer, the slurry coat, and a top coat.

7. The method of claim 1 wherein the method of treating the floor produces a floor coating on the floor, the floor coating comprising the slurry coat, the floor coating having a bottom interface in contact with the floor and an exposed top interface, wherein the floor coating is devoid of a pigmented color coat between the slurry coat and a primer layer.

8. A method of treating a floor, the method including mixing together a Part A comprising a resin and a Part B comprising a hardener to form an activated multicomponent resin system, the activated multicomponent resin system having a viscosity in a range of 900-1,200 centipoise, the method further comprising mixing a Part C comprising particles into the activated multicomponent resin system to form a slurry, spreading the slurry over a floor to form a slurry coat having a bottom interface and a top interface, and allowing the slurry coat to cure, such that before and after the slurry coat has cured it has particles of the Part C distributed substantially uniformly throughout including from the bottom interface to the top interface, wherein the floor includes a divot, the divot having a depth of at least ⅛ inch, and said spreading the slurry over the floor to form the slurry coat includes applying some of the slurry into the divot, such that the slurry coat has a region that is located in and over the divot and is defined as a divot region, the divot region of the slurry coat being level with adjacent regions of the slurry coat.

9. The method of claim 8 wherein the divot region has a color substantially matching that of adjacent regions of the slurry coat.

10. The method of claim 8 wherein the divot region has a visual appearance substantially matching that of adjacent regions of the slurry coat.

11. The method of claim 10 wherein the method is devoid of individually filling the divot prior to said spreading the slurry over the floor.

12. The method of claim 11 wherein the depth of the divot is greater than ⅛ inch but less than ¼ inch.

13. The method of claim 1 wherein the slurry coat has a thickness of greater than 120 mils.

14. The method of claim 13 wherein the thickness of the slurry coat is less than ½ inch.

15. The method of claim 1 wherein after the slurry coat has cured it has a compressive strength of 13,000 psi or greater.

16. The method of claim 1 wherein the slurry is characterized by a loading of the Part C in a range of 11-13 pounds/gallon, the loading being defined by a weight of the Part C relative to a volume of the activated multicomponent resin system.

17. The method of claim 1 wherein after the slurry coat has cured it has a static coefficient of friction in a range of between 0.50 and 0.90.

18. The method of claim 17 wherein the Part A, the Part B, or both comprise a polyacrylate additive.

19. The method of claim 18 wherein a polyacrylate additive is present in the activated multicomponent resin system at an amount between 0.25% and 1.25% relative to a total weight of the Part A and Part B.

20. The method of claim 1 wherein the top interface of the slurry coat is exposed, and the method is devoid of any sanding or grinding step on the top interface of the slurry coat.

21. The method of claim 1 further comprising repairing the slurry coat by a repair method comprising: (a) removing a region of the slurry coat so as to create a recessed area, (b) applying repair Part C particles onto the recessed area, (c) filling the recessed area with a repair slurry, and (d) allowing the repair slurry to cure.

22. The method of claim 21 wherein said applying repair Part C particles onto the recessed area comprises dusting the repair Part C particles onto the recessed area.

23. The method of claim 21 wherein the repair method includes making the repair slurry by: (i) mixing together a repair Part A comprising a resin and a repair Part B comprising a hardener to form an activated multicomponent repair resin system, the activated multicomponent repair resin system having a viscosity in a range of 900-1,200 centipoise, and (ii) mixing a repair Part C comprising particles into the activated multicomponent repair resin system to form the repair slurry.

24. The method of claim 1 wherein the slurry coat has a thickness in a range of 40 mils to 1 inch.

25. The method of claim 1 further comprising depositing a top coat over the slurry coat, the top coat having an adhesion to the slurry coat of greater than 400 psi.

26. A method of treating a floor, the method including mixing together a Part A comprising a resin and a Part B comprising a hardener to form an activated multicomponent resin system, the activated multicomponent resin system having a viscosity in a range of 900-1,200 centipoise, the method further comprising mixing a Part C comprising particles into the activated multicomponent resin system to form a slurry, spreading the slurry over a floor to form a slurry coat having a bottom interface and a top interface, and allowing the slurry coat to cure, such that before and after the slurry coat has cured it has particles of the Part C distributed substantially uniformly throughout including from the bottom interface to the top interface, the method further comprising forming a cove adjacent the floor, said forming the cove comprising applying a modified slurry to a vertical section of wall, the modified slurry formed by: (i) mixing together a Part A comprising a resin and a Part B comprising a hardener to form an activated multicomponent cove resin system, the activated multicomponent cove resin system including an additive and having a viscosity in a range of 8,000-12,000 centipoise, and (ii) mixing a Part C comprising particles into the activated multicomponent cove resin system.

27. The method of claim 26 wherein the additive comprises polyethylene fibers.

28. The method of claim 1 wherein said spreading the slurry over the floor comprises pouring the slurry onto the floor, spreading the slurry over the floor, and thereafter back rolling the slurry with a porcupine roller.

29. The method of claim 1 wherein the method of treating the floor produces a floor coating on the floor, the floor coating comprising the slurry coat, the floor coating including a primer layer between the floor and the slurry coat, but there is no layer between the primer layer and the slurry coat.

30. The method of claim 1 wherein the method of treating the floor produces a floor coating on the floor, the floor coating comprising the slurry coat, the floor coating having a total thickness of less than 100 mils.

* * * * *